United States Patent
O'Connell

(10) Patent No.: US 10,639,954 B2
(45) Date of Patent: May 5, 2020

(54) MULTI-LINK SUSPENSION SYSTEM

(71) Applicant: Jay O'Connell, New Albany, OH (US)

(72) Inventor: Jay O'Connell, New Albany, OH (US)

(*) Notice: Subject to any disclaimer, the term of this patent is extended or adjusted under 35 U.S.C. 154(b) by 16 days.

(21) Appl. No.: 15/712,935

(22) Filed: Sep. 22, 2017

(65) Prior Publication Data

US 2018/0086171 A1 Mar. 29, 2018

Related U.S. Application Data

(60) Provisional application No. 62/398,818, filed on Sep. 23, 2016.

(51) Int. Cl.
| | |
|---|---|
| *B60G 17/06* | (2006.01) |
| *F16F 9/50* | (2006.01) |
| *B60G 13/04* | (2006.01) |
| *F16F 9/32* | (2006.01) |
| *B60G 3/18* | (2006.01) |
| *F16F 1/12* | (2006.01) |

(52) U.S. Cl.
CPC ............ *B60G 17/06* (2013.01); *B60G 3/18* (2013.01); *B60G 13/04* (2013.01); *F16F 1/121* (2013.01); *F16F 9/3207* (2013.01); *F16F 9/50* (2013.01); *B60G 2200/18* (2013.01); *B60G 2204/124* (2013.01); *B60G 2204/14* (2013.01); *B60G 2204/416* (2013.01); *B60G 2206/911* (2013.01)

(58) Field of Classification Search
CPC .......... B60G 17/06; B60G 3/18; B60G 13/04; B60G 2204/416; B60G 2204/14; B60G 2204/124; B60G 2200/18; B60G 2206/911; F16F 1/121; F16F 9/3207; F16F 9/50

See application file for complete search history.

(56) References Cited

U.S. PATENT DOCUMENTS

| | | | | |
|---|---|---|---|---|
| 3,677,561 A | * | 7/1972 | McNally | B60G 13/08 |
| | | | | 267/64.16 |
| 4,366,969 A | * | 1/1983 | Benya | B60G 15/063 |
| | | | | 267/117 |
| 5,374,076 A | * | 12/1994 | Lee | B60G 3/26 |
| | | | | 280/124.143 |
| 5,415,427 A | * | 5/1995 | Sommerer | B60G 3/20 |
| | | | | 280/124.135 |
| 7,798,503 B2 | * | 9/2010 | McLaughlin | B60G 7/003 |
| | | | | 180/352 |
| 2003/0111812 A1 | * | 6/2003 | Carlstedt | B60G 7/006 |
| | | | | 280/124.16 |
| 2010/0308518 A1 | * | 12/2010 | Michel | B60G 15/068 |
| | | | | 267/218 |
| 2013/0221626 A1 | * | 8/2013 | Lee | B60G 17/08 |
| | | | | 280/5.514 |
| 2015/0061254 A1 | * | 3/2015 | Okuyama | B60G 3/20 |
| | | | | 280/124.138 |
| 2015/0213963 A1 | * | 7/2015 | Deng | H01G 11/06 |
| | | | | 361/527 |
| 2015/0314664 A1 | * | 11/2015 | Mochizuki | F16F 9/38 |
| | | | | 280/6.157 |
| 2016/0059652 A1 | * | 3/2016 | Weifenbach | B60G 7/003 |
| | | | | 280/86.757 |
| 2016/0347137 A1 | * | 12/2016 | Despres-Nadeau | B60G 3/202 |

(Continued)

*Primary Examiner* — Darlene P Condra
(74) *Attorney, Agent, or Firm* — Schaffer, Schaub & Marriott, Ltd.

(57) ABSTRACT

A multi-link suspension system that can be used to modify a MacPherson strut suspension system is described.

10 Claims, 13 Drawing Sheets

(56) References Cited

U.S. PATENT DOCUMENTS

Figure 1:
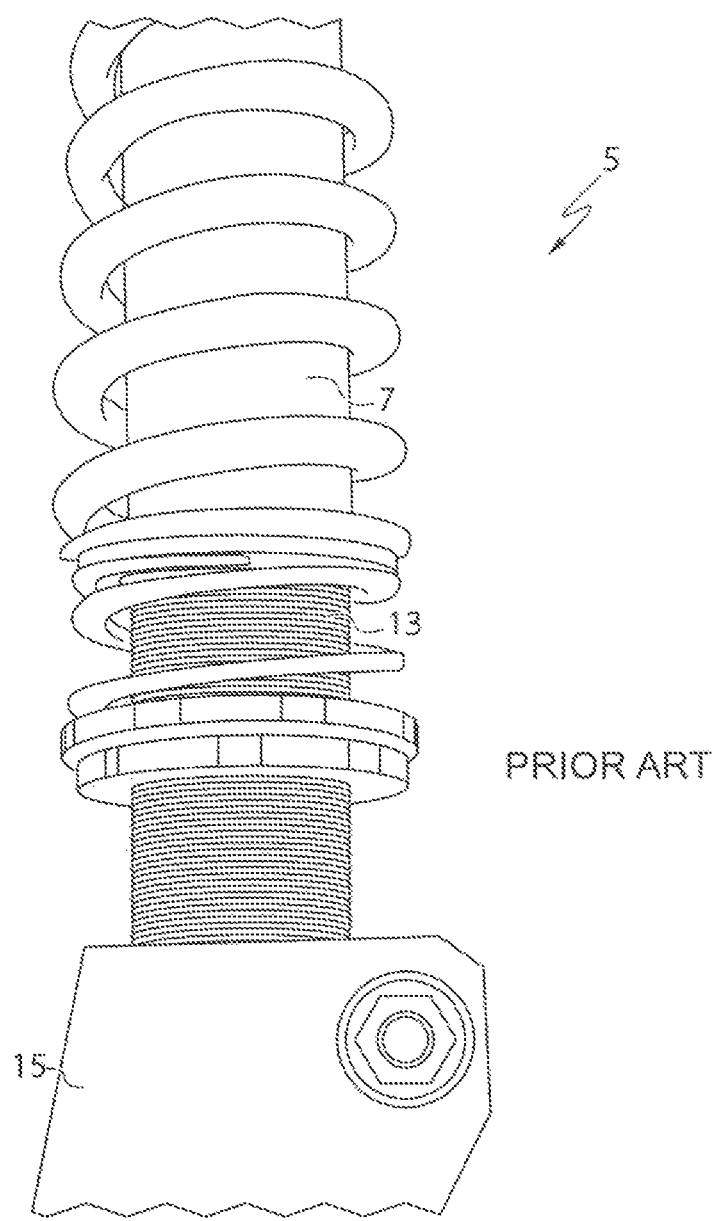

| | | | |
|---|---|---|---|
| 2017/0210192 A1* | 7/2017 | Reybrouck | B60G 3/18 |
| 2017/0320522 A1* | 11/2017 | Lorenz | B60G 3/18 |
| 2018/0105010 A1* | 4/2018 | Krishnan | B60G 13/003 |
| 2018/0313424 A1* | 11/2018 | Leonard | F16F 9/049 |
| 2019/0009632 A1* | 1/2019 | Holt | B60G 11/50 |

\* cited by examiner

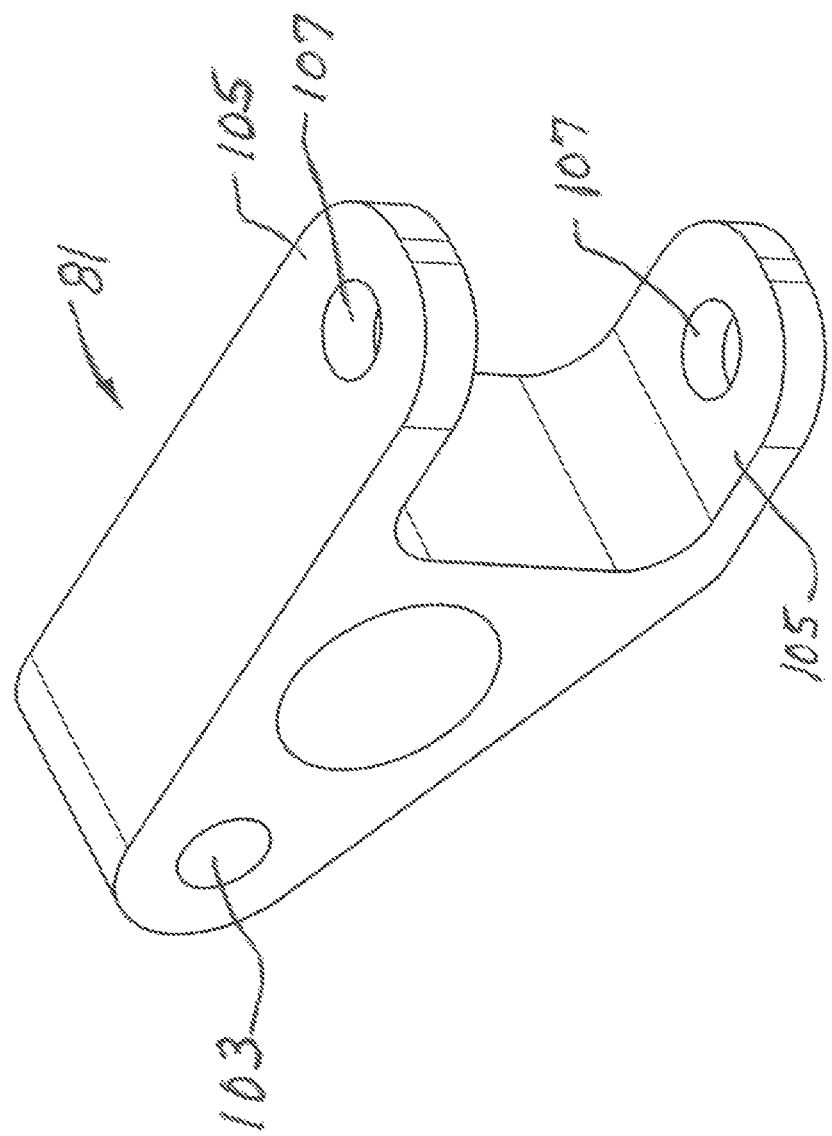

MULTI-LINK SUSPENSION SYSTEM

CROSS REFERENCE TO RELATED APPLICATIONS

This application claims the benefit of provisional application 62/398,818 filed on Sep. 23, 2016, and the provisional application is hereby incorporated by reference as part of this application.

BACKGROUND OF THE INVENTION

The invention is directed to a multi-link suspension system that can be used to convert a MacPherson strut suspension system to a multi-link arrangement.

MacPherson strut systems have been utilized for many years for suspension systems for vehicles. The MacPherson strut functions as the upper locating member for the wheel upright in the suspension system. The MacPherson strut has a suspension strut, a shock absorber and a spring fashioned into one element. The first end of the MacPherson strut attaches to the wheel upright and the second end attaches to the frame of the vehicle. The MacPherson strut is usually positioned in a substantially vertical alignment and it provides most of the control of the movement of the upper section of the wheel upright. The MacPherson strut arrangement has the advantage of providing a compact suspension arrangement for the upper section of the wheel upright. In some applications, the MacPherson strut arrangement does not provide a sufficient range of motion for the upper portion of the wheel upright to maximize the handling potential of the vehicle. In particular, the MacPherson strut arrangement does not provide the desired level of camber gain in wheel bump and vehicle roll required for high performance suspension applications. The present invention provides a multi-link suspension system for controlling the position of the upper section of the wheel upright while still allowing the shock absorber and vehicle spring to be retained in their original location. The multi-link suspension system can also accommodate the articulation angular displacement of the shock absorber and spring necessary to enhance the handling characteristics of the vehicle.

SUMMARY OF THE INVENTION

The invention is directed to a multi-link suspension system that can be used to modify an existing MacPherson strut suspension system on a vehicle.

Other objects and advantages of the present invention will become apparent to those skilled in the art upon a review of the following detailed description of the preferred embodiments and the accompanying drawings.

IN THE DRAWINGS

Figure 2:
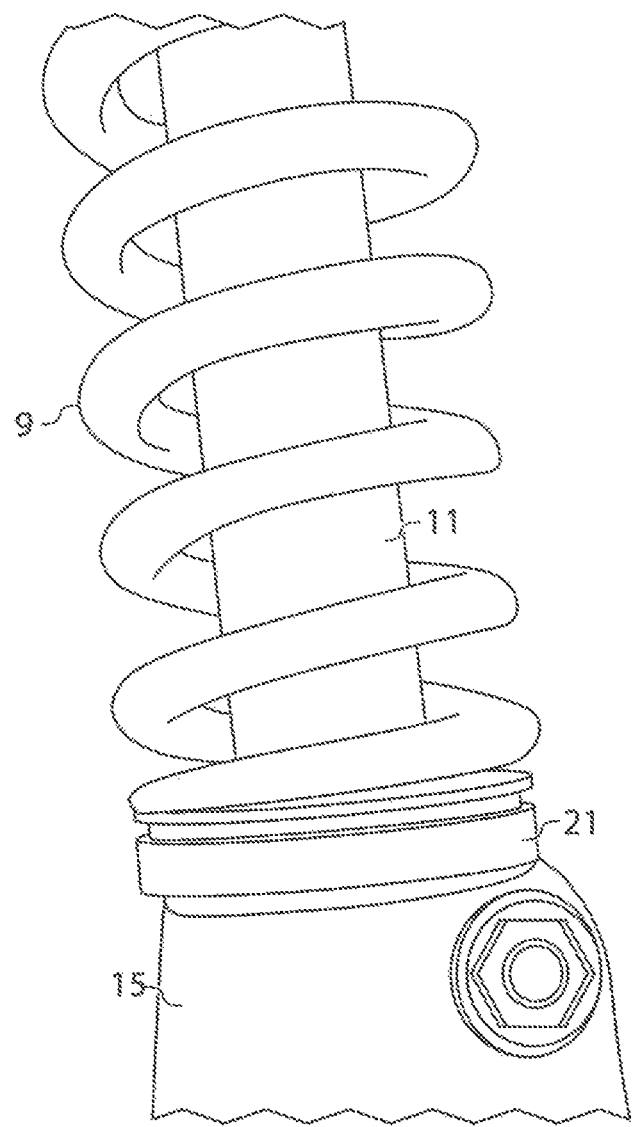
Figure 3:
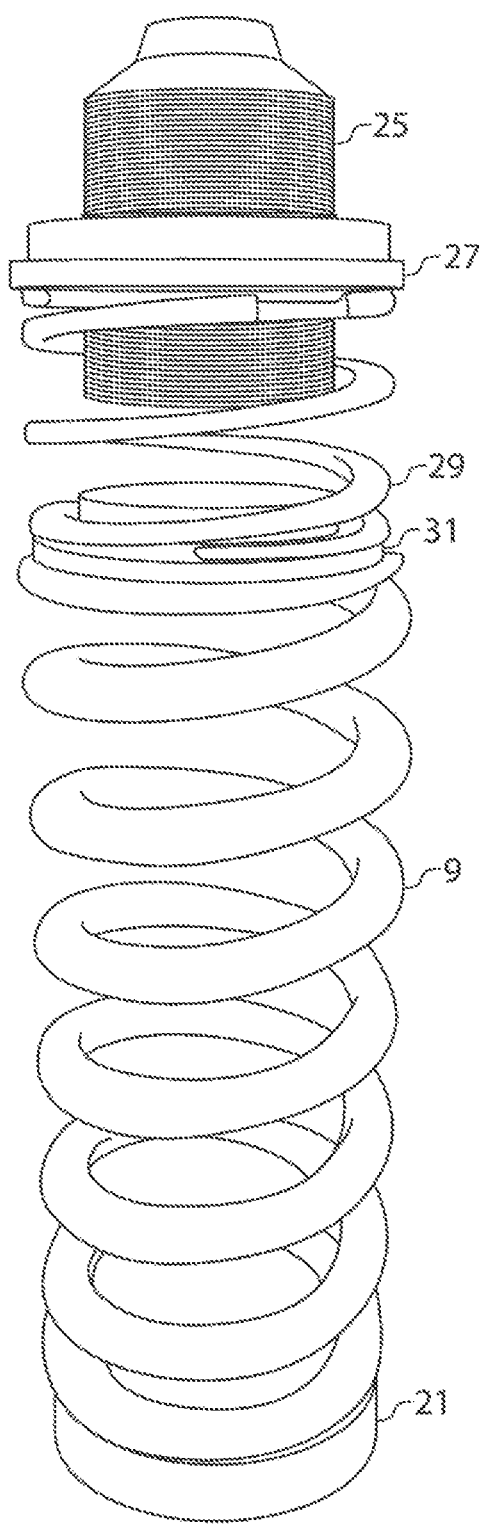
Figure 4:
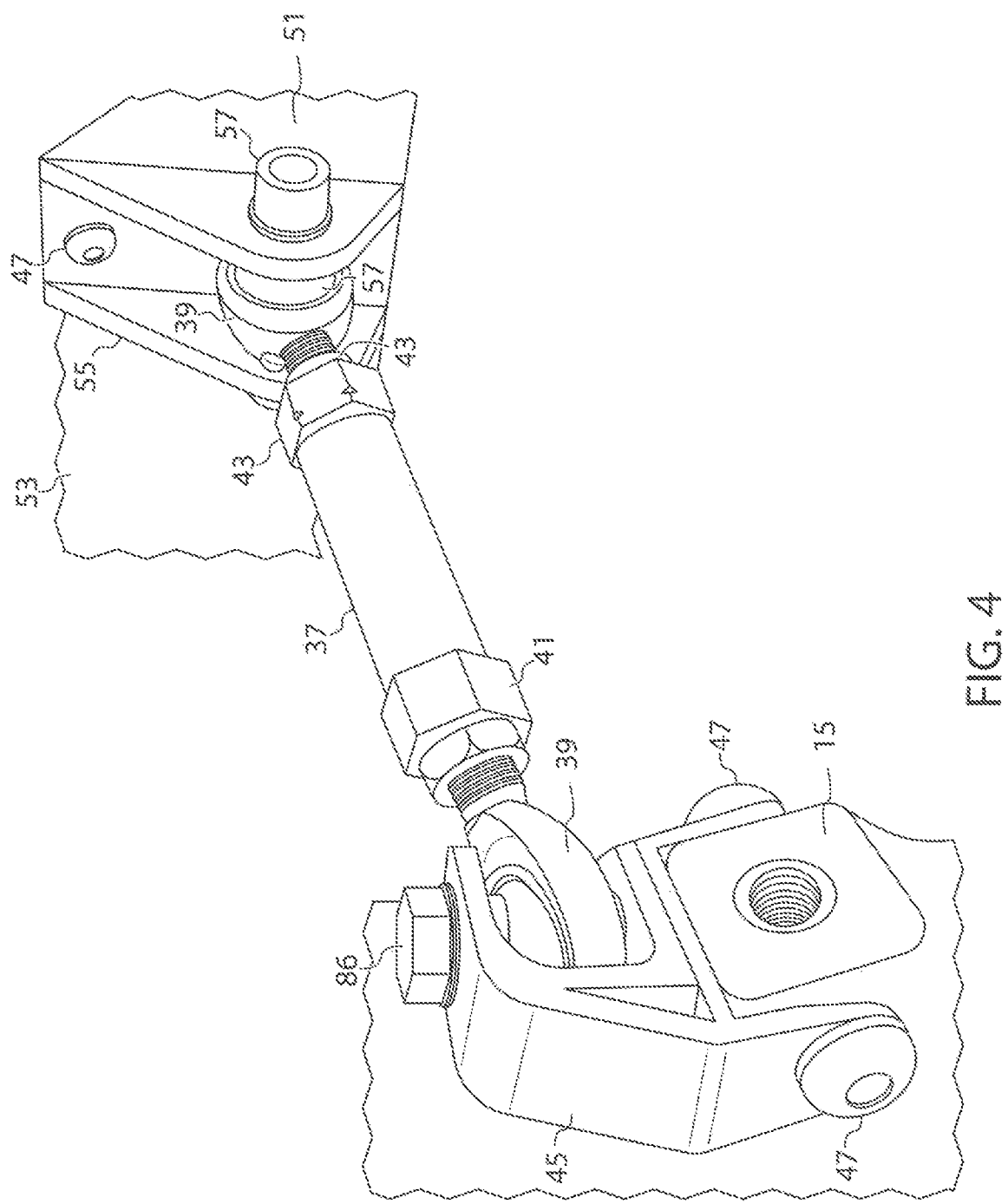
Figure 5:
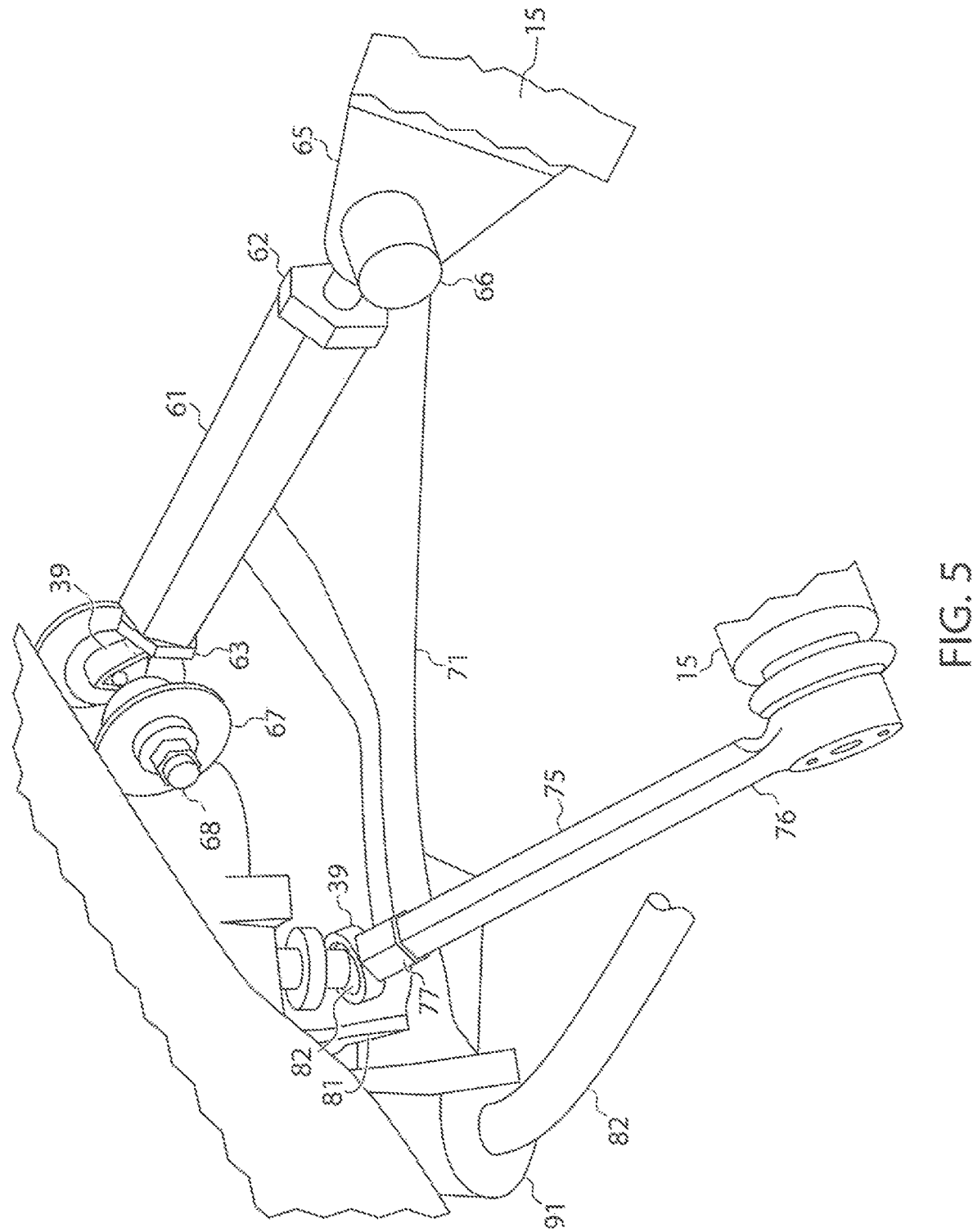
Figure 6:
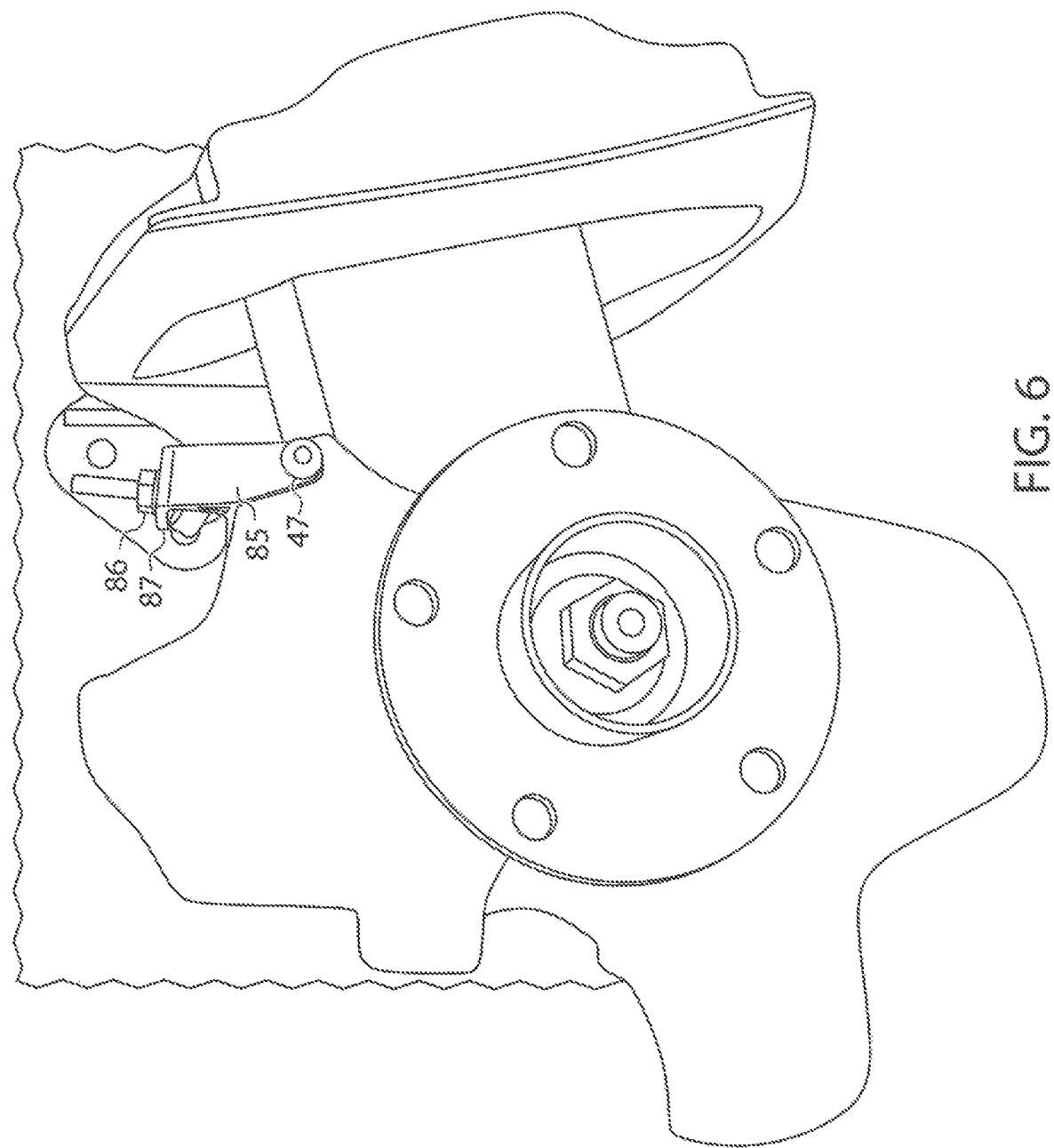
Figure 7:
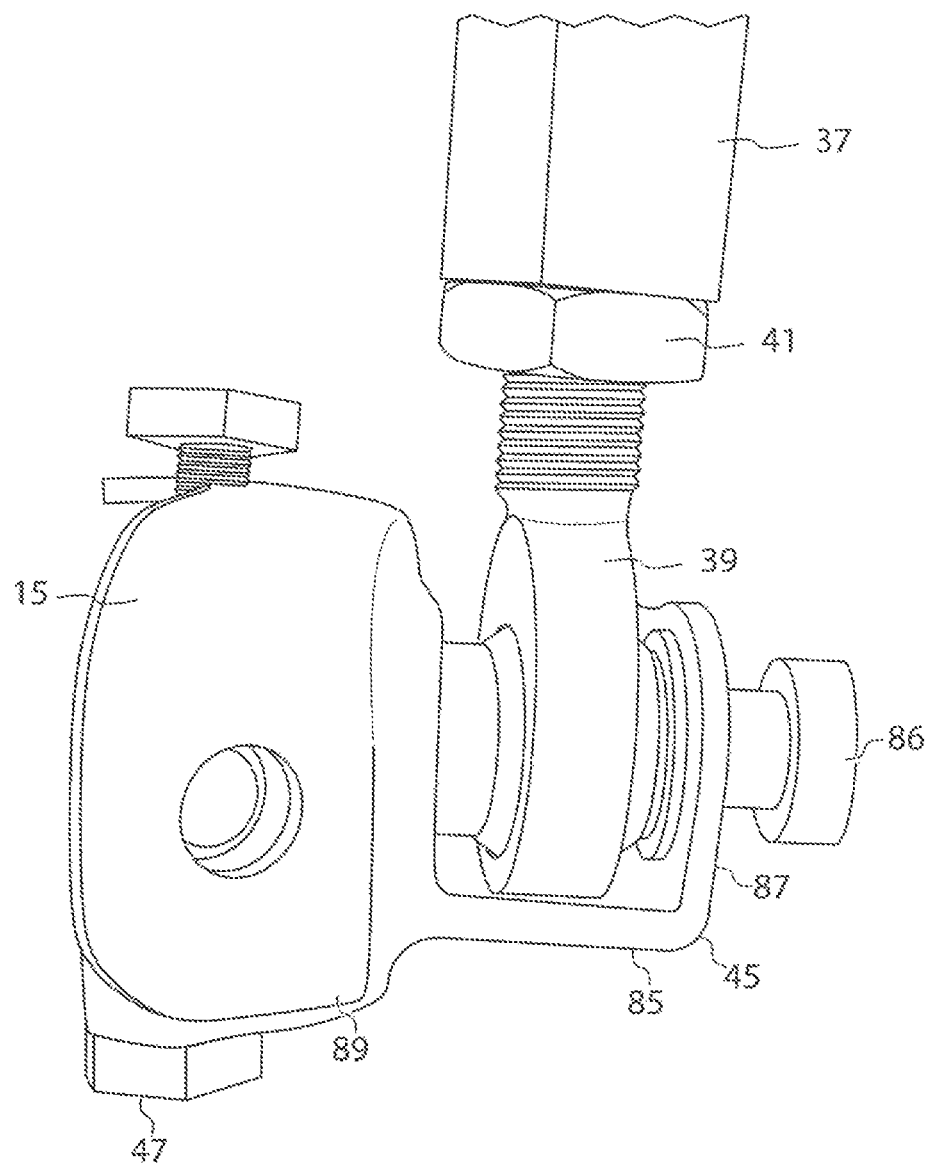
Figure 8:
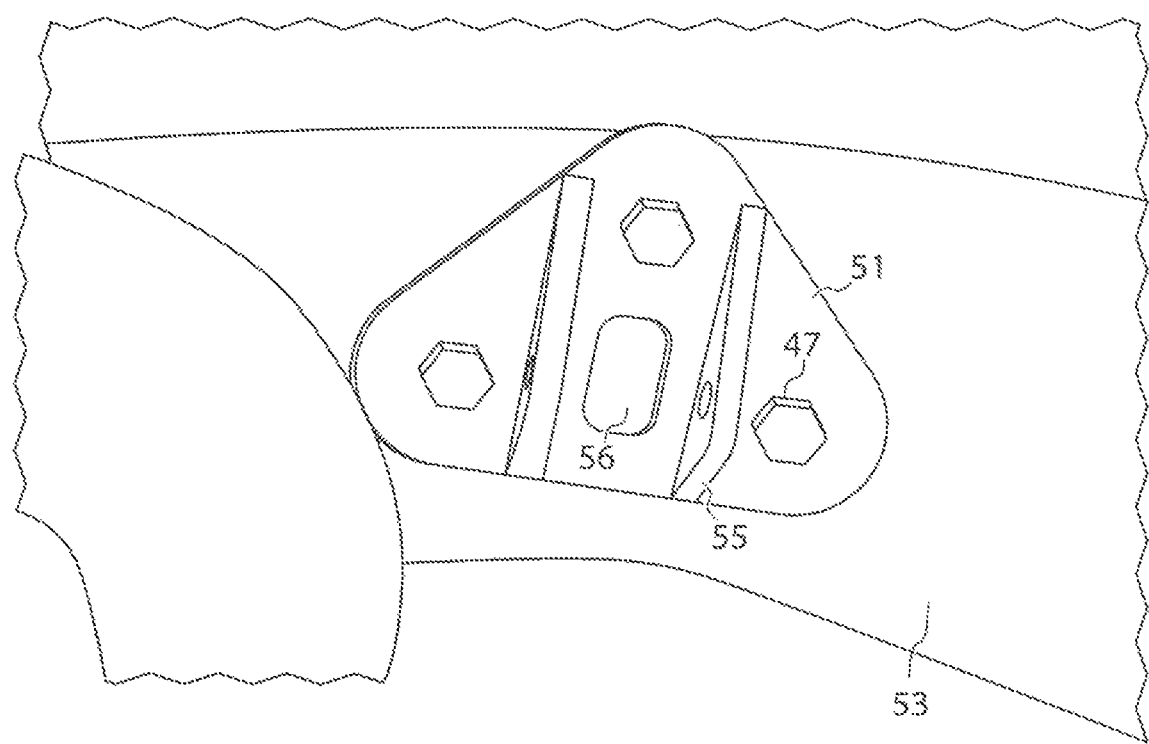
Figure 9:
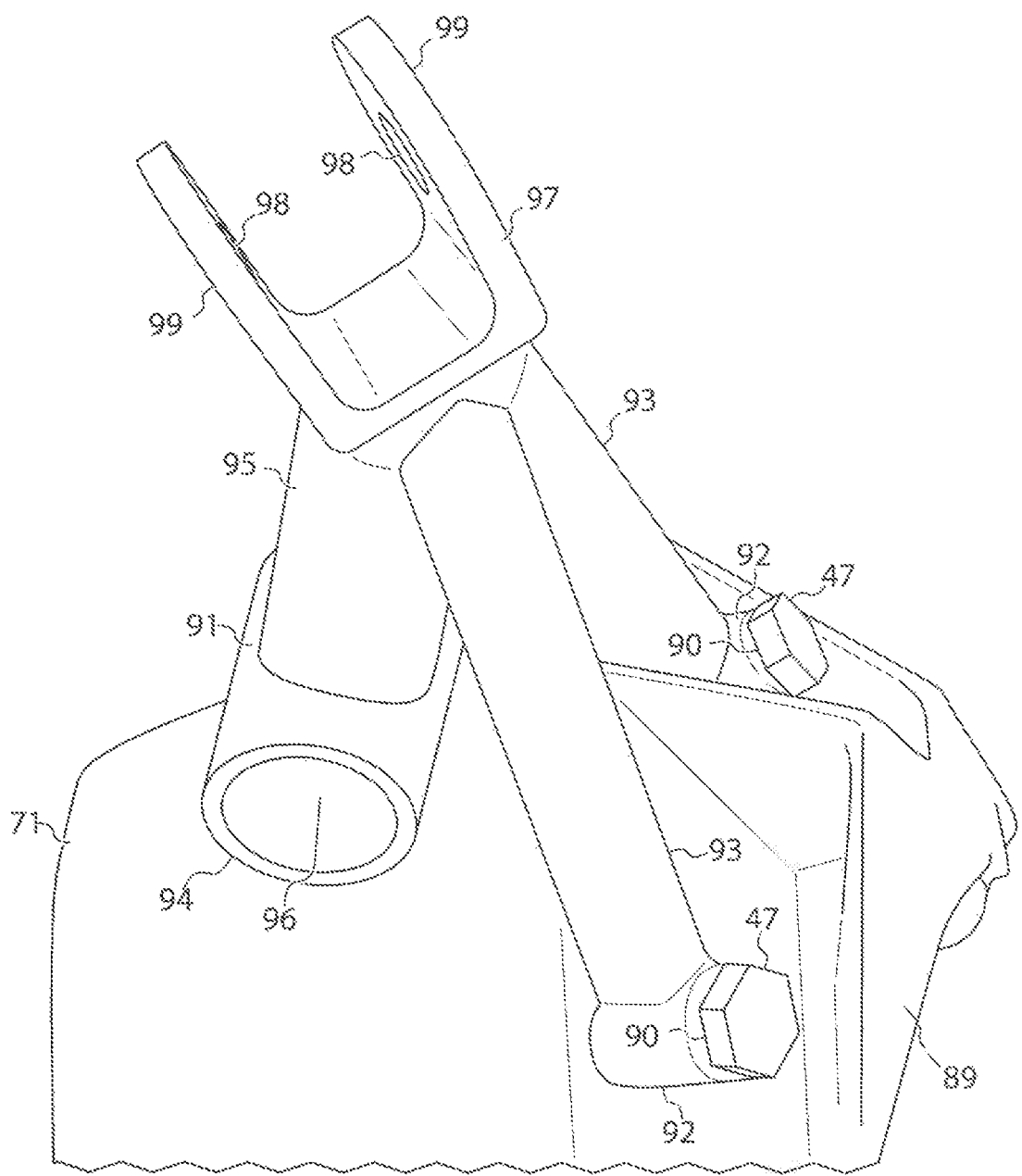
Figure 10:
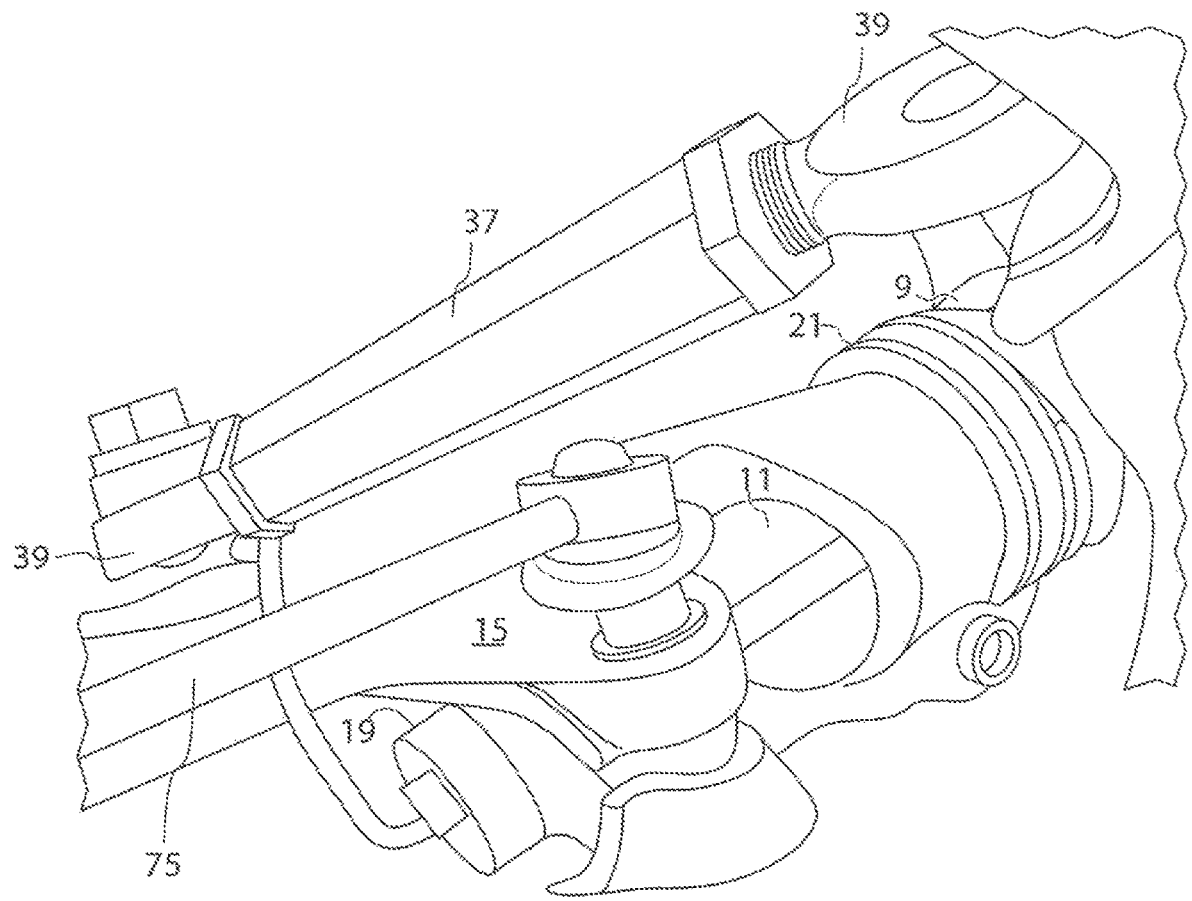
Figure 11:
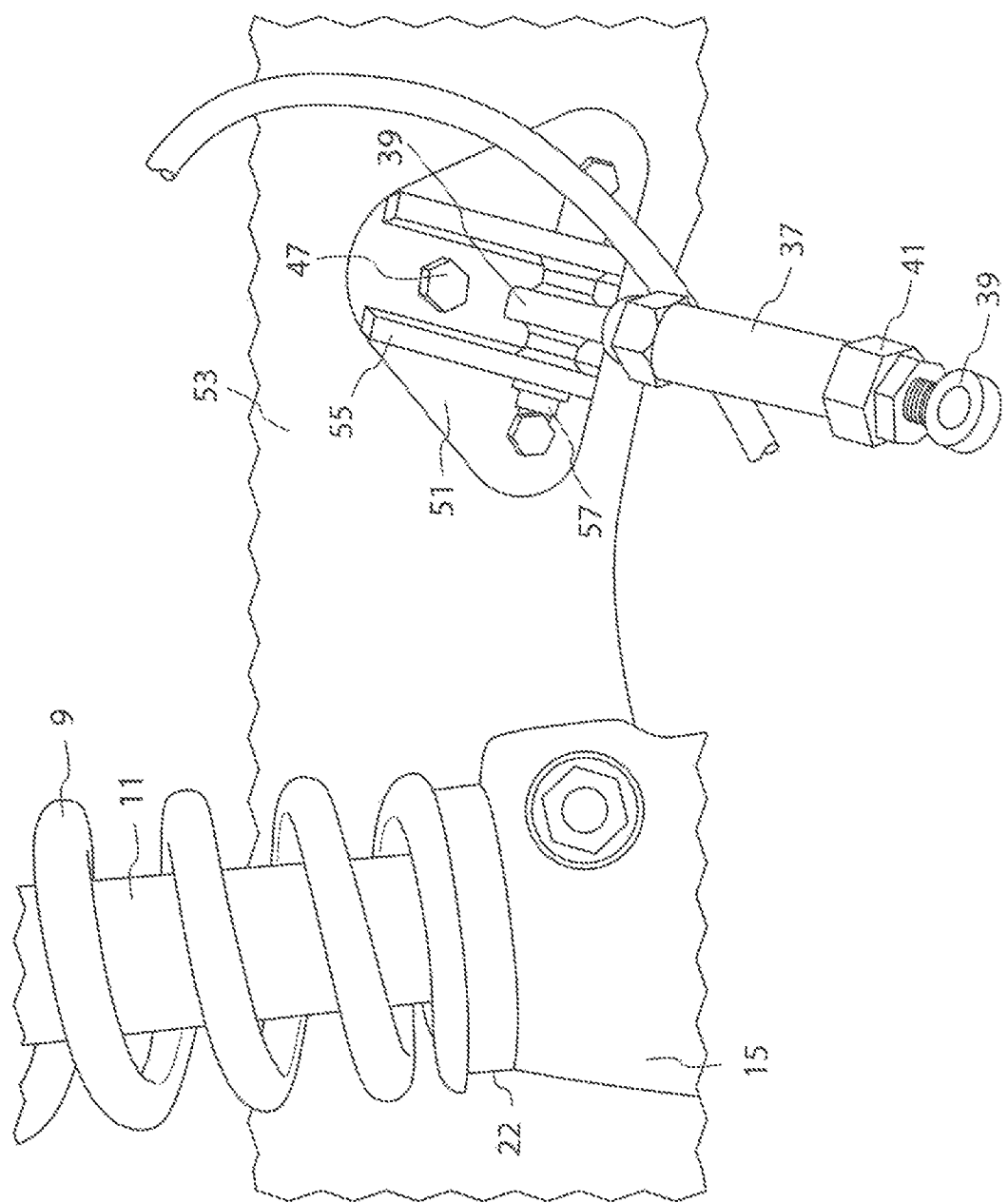
Figure 12:
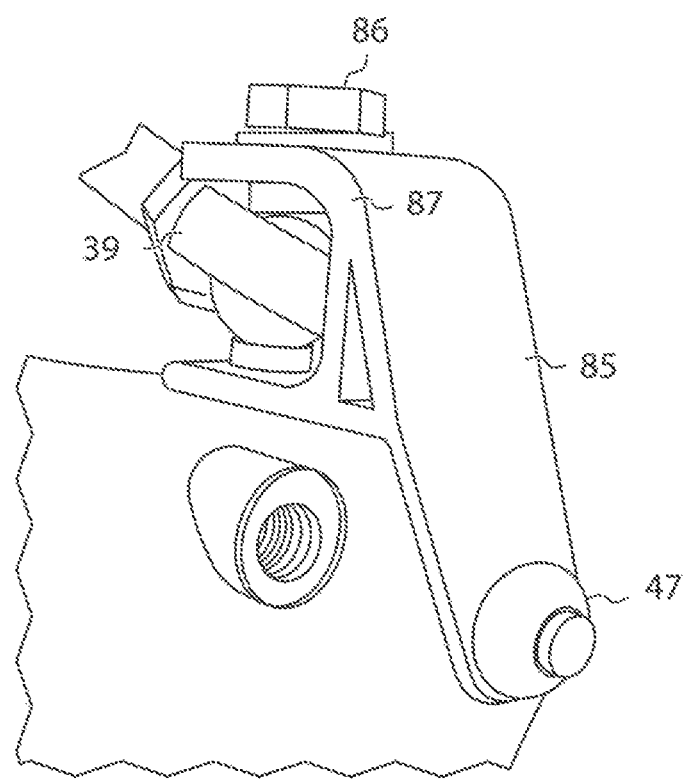

FIG. 1 is a side elevational view of a prior art MacPherson strut suspension system.
FIG. 2 is a side elevational view of the suspension system of the present invention.
FIG. 3 is a side elevational view of a coil spring used in the present suspension system.
FIG. 4 is a perspective view of the upper portion of the present invention.
FIG. 5 is a perspective view of the rear portion of the present invention.
FIG. 6 is a perspective view of the suspension system.
FIG. 7 is a perspective view of a mounting component.
FIG. 8 is a perspective view of a mounting bracket.
FIG. 9 is a perspective view of a mounting assembly.
FIG. 10 is a perspective view of the suspension system.
FIG. 11 is a perspective view of a feature of the invention.
FIG. 12 is a side perspective view of the suspension system.
FIG. 13 is a perspective view of a component of the invention.

DETAILED DESCRIPTION OF THE INVENTION

The suspension system of the current invention is designed to modify a MacPherson strut type of suspension system on a vehicle. More particularly, the system is designed to modify the rear suspension of the vehicle, although it should be recognized that this system could also be utilized the front suspension of a vehicle. The system is designed to improve the handling characteristics and vehicle dynamics when the vehicle is used in high performance applications. The features of the invention will be more readily understood by referring to the attached drawings in connection with the following description.

A MacPherson strut type of suspension has limitation when used in high performance application. The suspension system of the current invention was successfully used to modify the rear suspension of a Porsche Boxster/Cayman rear suspension. This modification resulted in significant improvements. The invention will be demonstrated using the Porsche example, but it should be recognized that the suspension system can be used on other MacPherson strut platforms with similar positive results. The system can also be used to modify a MacPherson strut system of either the front or rear of the vehicle platform. If the system is used at the front of the vehicle, an A arm upper link can be utilized in place of the two-upper links used for a rear suspension.

The rear strut suspension on the Porsche platform was converted to a multilink system by decoupling the damper or shock absorber from the upright and replacing it with two upper links. The links were attached to the upright and the chassis using stiff bolt on brackets that position the links around the stock exhaust. The modified suspension system achieved the target geometry including improvements in the camber curve, toe curve, and the position of the wheel center. The multilink suspension system of the present invention achieves significantly more negative camber in bump and roll, compared to the original strut suspension. This is achieved by inverting the camber gain curvature. Specifically, 2.5° more negative camber is available at full bump and 0.9° more negative camber at 3° degrees roll. The suspension system also achieves significantly less roll understeer, only 1.2% as compared to 8.4% with the stock MacPherson strut suspension system. There is also minimal toe out in rebound with the suspension system of the current invention. The roll center height is 46 mm higher than stock and the roll center height no longer drops when the vehicle is in a roll condition. The suspension system provides slightly more anti-squat resistance, 120% instead of 108%, and slightly less anti-lift characteristics, 54% instead of 58%. Drivers report much better high-speed cornering confidence, due to the increased camber gain and roll center stability, as well as more low speed agility due to the higher roll center. Stability during hard braking was also noticeably better due to less toe change in rebound conditions for the suspension system. In addition to the increased confidence, experience by the drivers, the drivers were also able to significantly improve their lap times with the suspension system of the current invention, as compared to the MacPherson strut suspension system originally used on the vehicle.

FIG. 1 shows the MacPherson strut type rear suspension on use in a vehicle. The MacPherson strut system 5 has a strut housing 7 with a coil spring 9 positioned around the strut housing. The shock absorber 11 is positioned inside the strut housing 7 as is shown in FIG. 2. The first end 13 of the strut housing 7 is secured to the upright 15 to which the wheel for the vehicle is attached. The second end 14 of the strut housing 7 is attached to the frame of the vehicle in a matter well known in the industry. The MacPherson strut 5 acts to locate the upper position of the upright 15 during motion or travel for the suspension system for the vehicle. The single element nature of the MacPherson strut system limits the motion for the upper section of the upright in a manner that is less than ideal, especially for high performance application of the vehicle.

The suspension system of the present invention is designed to modify the MacPherson strut system in a way that provides for better control of the upper portion of the upright while at the same time leaving most of the components of the MacPherson strut system in place. This allows the suspension system to be modified to improve the dynamic and handling characteristics of the vehicle while leaving the basics of the original suspension system in place on the vehicle.

As shown in FIGS. 2 and 10 the strut outer housing has been removed from the MacPherson strut system and the shock absorber 11 is mounted into a spherical bearing 19 positioned in the upright 15. The spherical bearing allows the shock absorber to move through a range from about plus 3° to about minus 3° with respect to the original axis of the bore in the upright 15. The coil spring 9 is positioned around the shock absorber and rests against a hydraulic spring perch 21 positioned on the top of the upright 15. The hydraulic spring perch secures/positions the lower end of the coil spring with respect to the upright 15. The hydraulic spring perch allows the coil spring to move from about plus 4° to about minus 4° with respect to an axis that is perpendicular to the top of the upright. As shown in FIG. 3 the upper portion of the coil spring 9 has a height adjuster 25 that interacts with an upper spherical bearing 27 that is located in the upper mounting section on the vehicle for the shock absorber 11. As shown in FIG. 3 a helper spring 29 can be utilized with the coil spring 9 to further adjust the performance characteristics of the vehicle suspension. As shown in FIG. 3, the height adjuster 25 is positioned on the helper spring 29 and an adaptor plate 31 is used to securely connect the helper spring 29 to the coil spring 9.

In some applications, it may be desirable to invert the shock absorber or damper to allow for a larger range of motion between the spherical bearing and the shock absorbers. The shock absorber in its normal orientation has a rod that extends from the top of the shock absorber and is securely mounted to the vehicle. When the shock absorber is inverted, the rod will be mounted in the spherical bearing on the upright 15. The small cross-sectional area of the rod allows for more clearance to the upright and allows the shock absorber to articulate more in the spherical bearing which provides more compliance for adjustment in the suspension system.

FIGS. 4 and 8 show the adjustable forward upper link 37 of the suspension system. A heim joint assembly 39 is positioned on each end of the forward upper link 37. The helm joint assembly on the first end 41 of the forward upper link 37 is attached to the upright 15 by means of an upright bracket 45 that is secured to the upright 15. The bolt 86 extends through the upright bracket 45, through the heim joint assembly 39 and is threadingly received in the upright 15. A bolt 86 operatively connects the forward upper link 37 to the upright 15. FIGS. 6, 7 and 12 show details of the bracket 45 that is used to secure the forward upper link 37 to the upright 15. The bracket has a housing 85 that is designed to receive the end of the helm joint 39. A bolt 86 extends through the top wall 87 of the cylindrical housing, the end of the helm joint and into the upright 15. The bolt that extends through the top wall assists in securing the helm joint 39 on the end of the forward upper link to the upright. Securing flanges 89 extend from three sides of the cylindrical housing and are designed to be adjacent portions of the upright 15. A bolt 47 extends through each securing flange and into the upright. The securing flanges and bolts act to securely position the bracket 45 on the uprights. A triangular shape bracket 51 is bolted to the vehicle frame 53. A pair of flanges extends from the triangular shape bracket 51 in a direction away from the vehicle frame 53. A bolt 57 extends through both flanges 55 and through the helm joint assembly 39 located on the second end 43 of the forward upper link 37. The bolt 57 operatively connects the second end 43 of the forward upper link to the vehicle frame 53. The triangular shaped bracket 51 is secured to the frame of the vehicle by three bolts 47 that are positioned adjacent each point of the triangular shaped bracket. A notch 56, as shown in FIG. 8, is positioned in the center of the triangular shaped bracket to provide clearance for movement of the end of the heim joint secured to the triangular shaped bracket.

In FIG. 5 the rearward upper link 61 has a heim joint assembly 39 connected to the first end 62 and the second end 63 of the upper link. A rear upright bracket 65 is positioned on the upper rear of the upright 15. A bolt 66 extends through the rear upright bracket 65 and the helm joint assembly 39 to secure the first end 62 of the rearward upper link 61 to the upright 15. A securing bracket 67 is positioned on the suspension carrier 71 that is secured to the vehicle. A bolt 68 extends through the securing bracket 67 and the helm joint assembly 39 positioned on the second end 63 of the rearward upper link 61. The bolt 68 operatively connects the rearward upper link 61 to the bracket 67. As shown in FIG. 9 the rearward upper link bracket 67 has a housing 91 that is designed to matingly engage a section of the suspension carrier 71. A bore 94 extends through the housing. A bolt 96 extends through the bore and engages the suspension carrier 71. The bolt assists in securing the housing to the suspension carrier. A spacer element 95 extends from the housing in a direction away from the suspension carrier. A pair of locating arms 93 are secured to the end of the spacer element 95 that is spaced apart from the housing 91. The locating arm 93 extend from the spacer element in a direction towards the suspension carrier 71. The ends 94 of the locating arms that are spaced apart from the spacer element 95 have a cylindrical mounting boss 92 mounted thereon. A bore 90 extends through the mounting boss 92. A bolt 47 extends through the mounting boss and acts to secure the locating arms to the suspension carrier 71. A U-shaped flange 97 is secured to the end of the spacer element 95 and the locating arms 93 that is spaced apart from the housing 91. A leg 99 extends from each side of the u-shaped flange and a hole 98 is positioned in each of the legs. The bolt 82 extends through the holes 98 in the legs 99 of the u-shaped flange and through the heim joint assembly 39 on the second end 63 of the rearward upper link 61. The longitudinal axis of the rearward upper link 61 is disposed to be substantially parallel to the longitudinal axis of the forward upper link 37.

As shown in FIGS. 5 and 13, a lower adjustable toe link 75 has a first end 76 which is secured to the rear portion of the upright 15 with a flexible coupling that is well known in the art. The second end 77 of the toe link 75 contains a helm joint assembly 39. A toe link bracket 81 secured to the suspension carrier 71 by a bolt that passes through opening 103 that extends through the toe link bracket. The toe link bracket 81 has opposed flanges 105 that extend from the end of the bracket that is spaced apart from the opening 103. A passageway 107 extends through both of the flanges 105. The passageways 107 are disposed for receiving a bolt 82. The bolt 82 extends through the toe link bracket 81 and the helm joint assembly 39 on the second end 77 of the lower toe link 75. The adjustable lower toe link 75 is a shorter link than the original lower toe link used in the suspension system so that the lower toe link will be compatible with the new forward upper link and new rearward upper link that has been added to the suspension system for the vehicle and control the steered position of the upright in a similar way to the original strut design.

The lower suspension components on the front side of the upright 15 do not normally need to be modified to accommodate the new linkages that have been provided for the suspension system for the vehicle.

In operation, the forward upper link 37 and the rearward upper link 61 control the positioning of the upper portion of the upright 15 as the suspension system of the vehicle moves through its range of travel. The spherical bearing 19 on the upright 15 along with the upper spherical bearing 27 that flexibly secures the coil spring 9 to the upright 15 and to the vehicle provide for a sufficient amount of angular displacement of the coil spring to accommodate the range of motion established by the forward and rearward upper links. In particular, the forward and rearward upper links allow the upright 15 to generate additional negative camber when suspension loads are placed on that side of the vehicle and the suspension system is compressed or moved in an upward direction. In practice, it has been found that the forward and rearward upper links can generate from about 2 to about 5 degrees of negative camber for the upright 15 and the wheel and tire that are attached to the upright. The spherical bearings that locate each end of the coil spring 9 have enough angular displacement to accommodate the negative camber produced by the forward and rearward upper links. The lower toe link 75 has been shortened to also allow for the negative camber in the upright 15 generated by the forward and rearward upper links. The helm joints 39 that are positioned on the forward upper link, the rearward upper link and the adjustable lower toe link allow for angular displacement of the links to accommodate the camber change as the links move through the range of motion for the suspension system. The heim joints have an adjustable feature which is well known in the art which allows the forward upper link, rearward upper link and lower toe link to be adjusted in length to allow the suspension system to be fine-tuned for various end use application. As an example, some applications may require the maximum amount of negative camber in the suspension system and the various links can be adjusted to produce this level of negative camber. Other applications may not need such a large change and camber for the upright 15 and the wheel and tire of the vehicle and the various links can be adjusted to reduce the amount of negative camber that is produced by the suspension system as it moves through its range of travel.

As shown in FIG. 11, the hydraulic spring perches 21 can be replaced with a spacer 22 as in most application it is not necessary to have the additional motion for the coil spring. The elimination of the hydraulic spring perches reduces the cost of the suspension system without significantly reducing the performance of the suspension system.

The above description is given for the sake of explanation. Various modifications and substitutions can be made without departing from the scope of the invention as defined by the following claims.

I claim:

1. A multi-link conversion suspension system for positioning a wheel for a vehicle using a strut damper comprising:
   - an adjustable forward upper link having a first end attached to a front of an upright for the wheel and a second end attached to a bracket, the bracket being attached to a frame of the vehicle;
   - an adjustable rearward upper link having a first end attached to a rear of the upright and a second end attached to a mounting support, the mounting support being attached to a suspension carrier; and
   - a spherical bearing secured to the upright, a lower end of the damper being positioned in the spherical bearing, the spherical bearing decoupling the damper from the upright whereby the forward and rearward upper links define the path of motion for the upright.

2. The suspension system of claim 1 wherein a first end of an adjustable toe link is connected to the upright.

3. The suspension system of claim 1 wherein a spring perch is positioned on the top of the upright, the spring perch being disposed for receiving a first end of a coil spring.

4. The suspension system of claim 3 wherein the spring perch is a hydraulic spring perch that can accommodate movement of the first end of the coil spring.

5. The suspension system of claim 3 wherein the spring perch is a spacer that positions the first end of the coil spring in spaced apart relationship with the upright.

6. The suspension system of claim 3 wherein a helper spring is positioned on the coil spring to assist in adjusting the performance characteristics of the suspension system.

7. The suspension system of claim 3 wherein a height adjuster is positioned on the coil spring wherein the height adjuster can be used to adjust the height of the suspension system.

8. The suspension system of claim 1 wherein a spherical bearing is secured to the vehicle, the spherical bearing being disposed for receiving a second end of a coil spring.

9. The suspension system of claim 1 wherein an outer housing for the strut has been removed to accommodate a larger range of motion for the damper.

10. The suspension system of claim 1 wherein the damper is inverted to provide more range of motion in the suspension system.

* * * * *